United States Patent [19]

Behr

[11] Patent Number: 4,919,863

[45] Date of Patent: Apr. 24, 1990

[54] FILTER FOR SMALL PARTICLES

[75] Inventor: Friedrich Behr, Krefeld, Fed. Rep. of Germany

[73] Assignee: Thyssen Edelstahlwerke AG, Krefeld, Fed. Rep. of Germany

[21] Appl. No.: 317,837

[22] Filed: Mar. 3, 1989

Related U.S. Application Data

[62] Division of Ser. No. 229,524, Aug. 8, 1988, Pat. No. 4,859,338.

[30] Foreign Application Priority Data

Aug. 6, 1987 [DE] Fed. Rep. of Germany ....... 3726076

[51] Int. Cl.$^5$ ............................................. B01D 13/04
[52] U.S. Cl. .................................... 264/42; 264/45.5; 264/48; 264/DIG. 48; 264/DIG. 62
[58] Field of Search ................. 264/41, 42, 45.1, 45.5, 264/48, DIG. 48, DIG. 62; 210/321.73, 321.74; 55/269, 128, 386

[56] References Cited

U.S. PATENT DOCUMENTS

| 3,858,435 | 1/1975 | Stevens | 55/128 |
| 4,093,435 | 6/1978 | Marron | 55/269 |
| 4,093,515 | 6/1978 | Kolobow | 210/321.74 |
| 4,101,278 | 7/1978 | Hartmann | 55/386 |
| 4,290,789 | 9/1981 | Newton | 55/269 |
| 4,500,426 | 2/1985 | Ishii et al. | 210/321.73 |

Primary Examiner—Frank Sever
Attorney, Agent, or Firm—Cushman, Darby & Cushman

[57] ABSTRACT

A method of producing a filter for separating solid particles, whose diameters are generally smaller than 5 μm, from flowing gases or liquids. A covering layer with columnar and/or platelet-shaped oxides is formed on a body consisting of porous steel foil at least in and around the pores.

11 Claims, 3 Drawing Sheets

FILTER FOR SMALL PARTICLES

This is a division of Application No. 07/229524, filed Aug. 8, 1988, U.S. Pat. No. 4,859,338.

The present invention relates to a device for filtering solid particles which have diameters smaller than approximately 5 μm from flowing gases or liquids, to a filter useful for that purpose and to a method for the manufacture of such a filter. Preferred applications for this filter are the removal of dust from waste gases of incinerators and combustion engines and the removal of particles from of waste gases and liquids produced by chemical and pharmaceutical plants.

BACKGROUND OF THE INVENTION

It is known that the filtration of very fine (superfine) dusts which have a particle size smaller than 5 μm, especially carbon particles emitted by diesel engines which have a particle size smaller than 0.5 μm and fine particles in slurries, presents special technical problems. For example, an attempt is being made at present to filter the carbon black from diesel engines with porous, ceramic honeycomb bodies of a type similar to catalyst carriers in which every second conduit is closed on one side of the front surface. In this type of filter, the carbon particles are burned periodically with the aid of a supplementary heating when the pressure loss of the filter is several hundred millibars. This device has a high heat capacity.

U.S. Pat. No. 2,061,370 teaches that small amounts of rare earths in ferritic heating conductor alloys exert a favorable influence on the oxidation resistance, especially on the adhesion strength, of oxide layers. The same applies to the elements yttrium, titanium and zirconium as alloy additives. Aluminum oxide fringe crystals (whiskers) are grown from such alloys with the aid of a two-stage oxidation (see British Patent 2,081,747). The manufacture of catalytic honeycomb bodies is mentioned as a potential application for these aluminum oxide whisker foils and the whiskers have the function of enlarging the adhesive surface and of raising the adhesive strength of further coats of ceramic powders (wash coat). Nothing can be learned from this publication concerning the use of such alloys for filter purposes.

SUMMARY OF THE INVENTION

The object of the present invention is to provide a body of a material which is as thin-walled as possible in order to keep pressure loss and weight low which body is able to filter fine and very fine particles such as aerosols or carbon black which have diameters smaller than 5 μm, especially from hot waste gases in which sharp variations of temperature frequently occur. A further object of the invention is to provide such a filter whose heat capacity is considerably less than that of known ceramic honeycomb bodies.

These and other objects are achieved by means of a method in which a layer comprising columnar and/or platelet-shaped oxides is formed at least in and around the pores of a body consisting of porous steel. The filter body formed by the method of the invention therefore consists of one or several steel foils comprising pores which has been provided with such a layer.

The metallic material is covered with an oxide layer at leas in the vicinity of the pores and to the extent possible over the entire foil surface. Columnar and/or platelet-shaped oxides are attached in or on the covering oxide layer by one of their front sides.

Columnar and/or platelet-shaped oxide can be produced from metallic material with the aid of an oxidation so that sufficiently small intervals are produced between the columns and/or platelets for filtering. The columnar and/or platelet oxides are suitable for forming "pores", that is, cracks cuts and/or holes in the steel foil which are approximately 10 μm wide in such a manner that intervals remain between them of approximately 0.1 to 0.5 μm. As noted above, the columnar and/or platelet-shaped oxides are permanently connected to a protective oxide layer covering the metal foil.

As is known, even the covering oxide layers of heat conductor materials have a tendency to burst off, partially in plate-like form, under high temperatures in conjunction with high temperature change stresses. In this way, the associated columnar and platelet oxides can be lost.

These temperature changes are especially strong when the product of the foregoing method is used as a filter, e.g. a filter for carbon particles. The temperature in the vicinity of the pores rises within seconds due to ignition and combustion of the carbon particle filtrate from approximately 350° C. to approximately 1000° C. In accordance with the present invention, it has been found that the edges of pores approximately 10 μm wide can be encased by the covering oxide layer in such a manner that, when the body is rapidly warmed, the oxide edge is loosened partially or entirely from the foil metal, but it remains cohesive within itself. In this manner, the oxide layer with the columnar and platelet oxides adhering to it remains mechanically locked in the pores.

The columnar oxides consist primarily of gamma aluminum oxide. Alpha aluminum oxide columns are not produced until heated to over 980° C.

The foil pores can be produced by mechanical methods such as a corrosive, thermal oxidation in the presence of chloride or by other known methods such as bombardment with lasers or an electron-beam.

A particularly advantageous method involves casting the material to a foil on a roller similar to the production of amorphous metallic bands, actually "full of imperfections". Given sufficient roughness of a roller consisting e.g. of copper or steel, heat cracks or fissures develop in the foil. The crack widths and the crack frequency can be set via the peak-to-valley height of the roller and via the foil thickness (nozzle slot width, width of the slot between the nozzle and the roller). FIG. 1 shows a typical formation of heat cracks obtained by casting heating conductor material 1.4767 (but with 9% aluminum) on a steel roller which had been roughened with coarse sandpaper. It is particularly advantageous if very thin crack edges are produced.

According to a further embodiment of the invention, it is advantageous, for improving the resistance of the oxide layer to temperature change, to coat the filter bodies prior to oxidation with a metal powder containing aluminum. It has proven to be advantageous to use a powder mixture of aluminum and ferroaluminum (approximately 50% iron and aluminum each) with maximum grain sizes of approximately 10% over the width of the pores. The powder mixture is applied as a slurry in a conventional manner to the foil body, dried and sintered on. The sintering-on preferably takes place in an $H_2/N_2$ protective gas furnace. A metallic contact is formed with the foil and of an aluminum nitride layer is formed on both metallic materials. The columnar oxides are grown later from this layer, with oxygen or atmospheric oxygen. In our own experiments, it was found that the columnar oxides, frequently designated as whiskers, and platelet oxides, could be grown from pure aluminum, Al-Ce 9%; Al-Ce 9% - Zr 2%; Al-Mg 0.5% - Si 6%; Al-Fe 50% and other alloys containing aluminum by means of a one-time oxidation in air at 920° C. Therefore, it is thought that the whisker formation is probably a natural property of aluminum. The fineness of the oxidic columnar crystals is particularly improved by means of the alloying addition of zirconium (up to approximately 3%). The presence of iron oxide, which forms separately and adhesively at the same time in shell form during the growth of oxide from ferroaluminum, lowers the ignition temperature of the carbon particles.

The additional powder coating permits pores to be used in the foil with diameters or crack widths of considerably more than approximately 10 μm. Moreover, it also considerably increases the temperature change resistance of the base oxidic layer. It obviously functions as a heat insulation and enhances the securing of the oxide layer at the pore edges covering the foil as well as of the oxide layer of the remaining foil surface. Aluminum oxide powder (wash coat) can also be used in addition or exclusively as a coating.

In order to form columnar oxides from the foil material, it is necessary that the material contains more than approximately 2% aluminum. This content is also necessary in order to be able to cure individual imperfections of the covering oxide layer. However, only foils with a maximum of approximately 5.5% aluminum can be manufactured by rolling, so that only a little aluminum is present in the base material (e.g., 1.4767 or 1.4765) for growing the columnar oxides. On the other hand, aluminum contents higher than 12% (after oxidation) allow the material to become brittle. Contents of 6 to 10% are advantageous.

It was found that the aluminum content of the foil (40-70 μm) can be raised with the aid of a friction coating by approximately 2 to 4%. A powder suitable for the subsequent powder coating is obtained at the same time by this method. The friction coating also permits stainless steels containing no aluminum to be soldered to each other in a high vacuum at 1200 to 1300° C. so that filters can also be manufactured from aluminum-free steels by subsequently growing the columnar oxides primarily from the coating powder, which either also comprises a covering oxide layer or is then completely oxidized.

In contrast thereto, it is more advantageous for carbon particle filters for diesel engines to start with ferritic heat conductor materials as the foil, to raise the aluminum content to approximately 7.5 to 9.5% by friction-coating and to perform the soldering of the foil in a vacuum. If a suitable binder is used in the powder slurry and the coating is annealed (sintered), e.g. in pure hydrogen, the aluminum content of the foils, which have then become brittle, can be increased even more by the powder by means of diffusion so that very long columns with a length up to approximately 10 μm and diameters of approximately 0.1 μm to 0.2 μm can be grown (at 900 to 930° C., up to approximately 24 hours) and a residual aluminum content of more than 2% nevertheless remains in the foil.

It was also found that a porous foil can be produced by casting an alloy which has a high aluminum content (9% Al, 24% Cr, 0.5% Zr, 0.6% Si) onto a roller in the same manner as in the production of amorphous metals. In spite of its high aluminum content, this foil can be friction-coated with aluminum and 1% zirconium and stamped in corrugations as well as connected to a honeycomb body by soldering in a vacuum. The aluminum of the friction coating functions as a solder component. Particularly long and thin columnar oxides were likewise able to be grown from the above without dropping below the minimum aluminum content of the foil.

Furthermore, tests have shown that the usage of the described stamping and winding method according to Published German Patent Specification DE-OS 27 59 559 results in an especially advantageous conduit form for carbon black filters. As a result of the alternating zones (in the direction of flow) with alternating pressure loss of the conduits between two foil layers, a part of the gas flow is pressed through the pores of the foils into the conduits of the adjacent layers and filtered. As a result of the radius of foil layer to foil layer which increases during winding, the pressure loss zones occur almost always at axially different positions. In this manner, separation rates of more than 90% of the carbon black were obtained without the conduits having to be plugged in alternating fashion. The raising of the adhesive strength of the covering oxide layer can also additionally take place with known methods such as alloying with approximately 0.04% cerium or yttrium. One combination has proven to be especially well-suited for this purpose: approximately 0.5% titanium in e.g. aluminum-free chrome steel (1.4510) with an aluminum friction coat or friction and powder coat containing approximately 1 to 2% zirconium. Approximately 0.04 to 1% yttrium in the friction and powder aluminum coating is also advantageous. In order to hold the coating aluminum for the most part on the surface so that the growth of the columnar oxides and platelet oxides can take place with furnace times which are as short as possible, it is advantageous to perform the sintering of the powder coating in a $N_2/H_2$ soldering furnace. The nitrogen content results in the formation of aluminum nitride at up to 1100° C., in which instance the aluminum powder component is already sintered before the formation of nitride. According to the invention, columnar oxides can be thermally grown and platelet oxides chemically grown from the aluminum nitride. The furnace times are shortened to approximately 12 hours instead of 20 hours (5 μm long columns) if the furnace is washed with pure oxygen after 920° C. has been reached.

A treatment of aluminum-coated and also aluminum nitride-coated foils with an aqueous solution of 50 g sodium carbonate per liter and 15 g sodium chromate per liter at 90° C. with approximately 10 minutes immersion time (MBV method) [=modified Bauer-Vogel method for surface protection on aluminum] with subsequent dehydration at higher temperatures (550° C.) results in the formation of a platelet oxide coating, in which instance platelet spaces at intervals of approximately 0.2 μm are likewise suitable for filtering.

BRIEF DESCRIPTION OF FIGURES OF DRAWING

FIG. 1 shows a raster electron microscope photograph of a porously cast foil (heat crack) with the composition: 9% Al, 0.5% Zr. 0.03% Ce, 22% Cr, 0.5% Si, remainder iron as well as the customary accompanying elements.

FIG. 2 is a schematic view of the cross section of a section of foil 2 with a pore 1 and shows oxide layer 3 covering the pore with columnar oxides 4 adhering to it.

FIG. 3 shows the cross section of a foil section with a pore 1 and oxide layer 3 covering it and powder coating 5 and shows columns 4 and plate oxides 6 adhering thereto.

FIG. 4 shows columnar oxides on a pore edge in an enlarged view.

DETAILED DESCRIPTION OF PREFERRED EMBODIMENT

Figure 1B:
Figure 1D:
Figure 1A:
Figure 1C:
Figure 2:
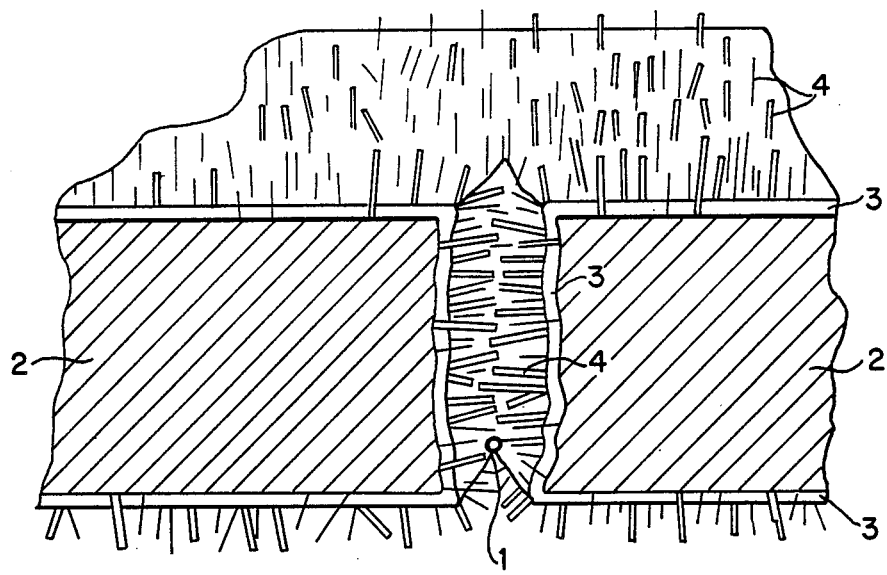
Figure 3:
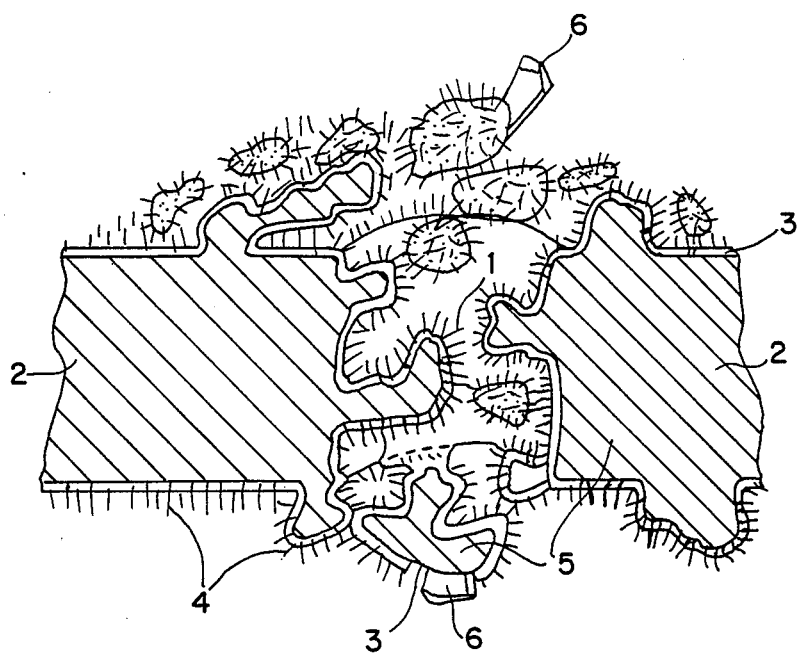
Figure 4:

The invention is illustrated by the following example.

A 40 μm thick foil of a steel, Material No. 1.4510, was stamped with the aid of a toothed stamping roller pair with arrow-shaped undulations (6° tooth angle, undulation height 1 mm, flank angle 15°, spacing 2 mm). The foil was then coated 2 μm thick with aluminum alloy containing 1% zirconium on both sides by rubbing it on. Then a series of cuts approximately 3 mm long was made at intervals of approximately 1 mm and the foil was then formed by winding to a cylindrical body. The wound body was held together with molybdenum wire and connected permanently to itself at 1280° C. in high vacuum by soldering with the aluminum coating acting as essential soldering component.

After removal of the molybdenum wires, the body was coated in a slurry based on an organic binder and an organic solvent for the binder of 60 g aluminum powder per liter (equal to or smaller than 20 μm) and 100 g ferroaluminum powder per liter (equal to or smaller than 60 μm). Then, the body was coated with 30 grams per liter solid matter and dried, and the powder sintered on under a $H_2/N_2$ protective gas up to 1050° C. (dew point - 40° C.). Subsequently, 5 μm long columns consisting primarily of aluminum oxide and/or platelets consisting primarily of iron oxide were grown on the coated foil material at an interval of under 1 μm by means of a 12-hour annealing in air at 920° C.

What is claimed is:

1. A method comprising manufacturing a material for use in a filter body for filtering solid particles with diameters generally smaller than 5 μm from flowing fluids, said body having pores and columnar and/or platelet-shaped oxides at least in and around the pores, said filter body comprising at least one steel foil (2) which is provided with an oxidic covering layer (3) containing columnar and/or platelet-shaped oxides (4,6) said by forming an oxidic covering layer containing columnar and/or platelet-shaped oxides at least in and around the pores of a porous steel foil.

2. A method as set forth in claim 1 including the step of forming the pores of the steel foil by a plurality of cuts.

3. A method as set forth in claim 1 in which the pores are produced during the manufacture of the foil by means of casting onto a roller or between two rollers as in the manufacture of amorphous metals.

4. A method as set forth in claim 1 in which the pores are produced during the manufacture of the foil by means of casting onto one roller or between two roughened rollers in the form of heat cracks.

5. A method as set forth in any one of claims 1 to 4, including applying an aluminum friction coating onto the porous steel foil, applying a metal powder coating containing aluminum thereon and subsequently annealing to form an oxide layer from the metal powder coating as well as from the foil material from which oxide layer aluminum oxide columns and/or platelets are grown during the annealing.

6. A method as set forth in claim 5 in which the metal powder is sintered on under protective gas.

7. A method as set forth in claim 5 in which a mixture of aluminum powder with a grain size equal to or smaller than 60 μm and ferroaluminum powder and/or iron powder with a grain size equal to or smaller than 100 μm is used for the coating.

8. A method as set forth in claim 7 in which the metal powder is sintered on under protective gas.

9. A method as set forth in any one of claims 1 to 4 in which the oxide columns and/or platelets are produced by chemical and/or thermal oxidation.

10. A method as set forth in any one of claims 1 to 4 in which the steel foil is low in carbon and contains 12 to 30% chromium.

11. A method as set forth in claim 10 in which the steel foil consists of 12 to 30% chromium, up to 12% aluminum, a total of 0.001 to 0.7% titanium, zirconium, yttrium, one or more of the rare earths, individually or several together, remainder iron.

* * * * *